United States Patent
Yang et al.

(10) Patent No.: US 12,428,843 B2
(45) Date of Patent: Sep. 30, 2025

(54) COMPOSITE MEMBRANE FOR BUILDING APPLICATIONS

(71) Applicant: BMIC LLC, Dallas, TX (US)

(72) Inventors: Li-Ying Yang, Whippany, NJ (US); Jeffrey Avitabile, Lodi, NJ (US); Joseph Nigro, Wayne, NJ (US); Daniel Podewils, Evansville, IN (US); Brian A. Davis, Kennett Square, PA (US); Eric R. Anderson, Montclair, NJ (US); Matthew Gimpert, Stewartsville, NJ (US); Yan Zheng, Livingston, NJ (US); Brian E. Duffy, Wayne, NJ (US); Yixi Xiao, Edison, NJ (US)

(73) Assignee: BMIC LLC, Dallas, TX (US)

( * ) Notice: Subject to any disclaimer, the term of this patent is extended or adjusted under 35 U.S.C. 154(b) by 34 days.

(21) Appl. No.: 18/342,573

(22) Filed: Jun. 27, 2023

(65) Prior Publication Data
US 2023/0340787 A1 Oct. 26, 2023

Related U.S. Application Data

(63) Continuation of application No. 17/039,326, filed on Sep. 30, 2020, now Pat. No. 11,767,673.
(Continued)

(51) Int. Cl.
*E04B 2/00* (2006.01)
*B29C 48/00* (2019.01)
(Continued)

(52) U.S. Cl.
CPC .............. *E04D 5/12* (2013.01); *B29C 48/022* (2019.02); *B29C 48/154* (2019.02); *B32B 3/12* (2013.01); *B32B 5/022* (2013.01); *B32B 5/024* (2013.01); *B32B 27/12* (2013.01); *B32B 27/20* (2013.01); *B32B 27/32* (2013.01); *B32B 37/153* (2013.01); *E04D 5/06* (2013.01); *E04D 5/10* (2013.01); *B29K 2023/12* (2013.01); *B29K 2105/0854* (2013.01); *B29L 2031/108* (2013.01); *B32B 2419/06* (2013.01)

(58) Field of Classification Search
CPC ........ B32B 3/12; E04D 5/10; B29L 2031/108
See application file for complete search history.

(56) References Cited

U.S. PATENT DOCUMENTS 3,293,108 A 12/1966 Naim et al.
4,320,162 A 3/1982 Schulz
(Continued)

FOREIGN PATENT DOCUMENTS

EP 1325992 B1 9/2005
WO 2004087451 A2 10/2004
(Continued)

*Primary Examiner* — Basil S Katcheves
(74) *Attorney, Agent, or Firm* — GREENBERG TRAURIG, LLP (57) ABSTRACT

A roofing composite membrane includes a base layer including a first thermoplastic polyolefin. A weight of the base layer is between 5 and 25 grams per square foot. A coating layer at least partially coats the base layer. The coating layer includes at least one inorganic additive, and a second thermoplastic polyolefin including polypropylene and having a melt flow rate between 0.5 grams per 10 minutes and 12 grams per 10 minutes.

20 Claims, 5 Drawing Sheets

Related U.S. Application Data (60) Provisional application No. 62/908,706, filed on Oct. 1, 2019, provisional application No. 62/908,051, filed on Sep. 30, 2019.

(51) Int. Cl.

| | | |
|---|---|---|
| *B29C 48/154* | (2019.01) | |
| *B32B 3/12* | (2006.01) | |
| *B32B 5/02* | (2006.01) | |
| *B32B 27/12* | (2006.01) | |
| *B32B 27/20* | (2006.01) | |
| *B32B 27/32* | (2006.01) | |
| *B32B 37/15* | (2006.01) | |
| *E04D 5/06* | (2006.01) | |
| *E04D 5/10* | (2006.01) | |
| *E04D 5/12* | (2006.01) | |
| *B29K 23/00* | (2006.01) | |
| *B29K 105/08* | (2006.01) | |
| *B29L 31/10* | (2006.01) | |

(56) References Cited

U.S. PATENT DOCUMENTS

| | | | |
|---|---|---|---|
| 4,518,643 A | 5/1985 | Francis | |
| 4,631,221 A | 12/1986 | Disselbeck et al. | |
| 5,374,477 A | 12/1994 | Lawless et al. | |
| 5,433,050 A * | 7/1995 | Wilson | E04D 13/172 |
| | | | 52/302.1 |
| 5,453,142 A | 9/1995 | Klein | |
| 5,498,385 A | 3/1996 | Yabusa et al. | |
| 5,626,936 A | 5/1997 | Alderman | |
| 5,770,295 A | 6/1998 | Alderman | |
| 5,795,639 A * | 8/1998 | Lin | F25D 23/063 |
| | | | 428/68 |
| 5,882,776 A | 3/1999 | Bambara et al. | |
| 5,919,556 A | 7/1999 | Barnholtz | |
| 6,070,629 A | 6/2000 | Whiteside | |
| 6,221,463 B1 | 4/2001 | White | |
| 6,617,014 B1 | 9/2003 | Thomson | |
| 6,645,598 B2 * | 11/2003 | Alderman | B29C 66/83513 |
| | | | 126/618 |
| 6,786,013 B2 | 9/2004 | Coulton | |
| 6,833,333 B2 | 12/2004 | Reisdorf et al. | |
| 6,860,082 B1 * | 3/2005 | Yamamoto | E04B 1/803 |
| | | | 52/406.1 |
| 6,904,731 B2 | 6/2005 | Wardle et al. | |
| 6,925,766 B2 | 8/2005 | Di Pede | |
| 6,926,947 B1 | 8/2005 | Seckel | |
| 7,707,799 B2 * | 5/2010 | Wrass | E04C 2/386 |
| | | | 52/309.4 |
| 7,753,254 B2 | 7/2010 | Straza | |
| 8,018,655 B2 | 9/2011 | Sacks et al. | |
| 8,061,098 B2 | 11/2011 | Whelan et al. | |
| 8,104,245 B2 | 1/2012 | Whelan et al. | |
| 8,156,703 B2 * | 4/2012 | Alderman | B32B 3/08 |
| | | | 52/407.3 |
| 8,919,061 B2 | 12/2014 | Kortuem et al. | |
| 8,959,839 B1 | 2/2015 | Hamlin, III | |
| 9,144,954 B2 | 9/2015 | Xiang | |
| 9,637,926 B2 | 5/2017 | Kraus, Jr. et al. | |
| 9,926,702 B2 * | 3/2018 | Rockwell | E04D 13/1625 |
| 10,265,928 B2 | 4/2019 | Takano et al. | |
| 10,293,981 B2 | 5/2019 | Borchardt et al. | |
| 10,301,828 B2 | 5/2019 | Shepherd | |
| 10,344,157 B2 | 7/2019 | Hoefflin et al. | |
| 10,458,120 B1 | 10/2019 | Zhang | |
| 10,465,067 B2 | 11/2019 | Hoefflin et al. | |
| 10,487,496 B2 * | 11/2019 | Alderman | E04B 1/7604 |
| 10,668,689 B2 | 6/2020 | Lee | |
| 10,676,918 B2 | 6/2020 | Caruso | |
| 10,920,058 B2 | 2/2021 | Hoefflin et al. | |
| 11,407,198 B2 | 8/2022 | Flaig et al. | |
| 11,421,094 B2 | 8/2022 | Cavalier et al. | |
| 2003/0061776 A1 * | 4/2003 | Alderman | F28D 20/02 |
| | | | 52/406.1 |
| 2003/0173014 A1 | 9/2003 | Wardle et al. | |
| 2004/0000113 A1 * | 1/2004 | Alderman | E04B 1/767 |
| | | | 52/404.1 |
| 2004/0009319 A1 * | 1/2004 | Zanchetta | E04D 5/10 |
| | | | 428/40.1 |
| 2004/0055240 A1 | 3/2004 | Kilk et al. | |
| 2004/0127614 A1 | 7/2004 | Jiang et al. | |
| 2004/0161569 A1 | 8/2004 | Zanchetta et al. | |
| 2004/0161570 A1 | 8/2004 | Zanchetta et al. | |
| 2005/0202197 A1 | 9/2005 | Mohseen et al. | |
| 2006/0201094 A1 | 9/2006 | Lassiter | |
| 2007/0193167 A1 | 8/2007 | Bruce et al. | |
| 2007/0248817 A1 | 10/2007 | Sieber et al. | |
| 2008/0092474 A1 | 4/2008 | Gan | |
| 2008/0248244 A1 | 10/2008 | Kalkanoglu et al. | |
| 2009/0181216 A1 | 7/2009 | Peng | |
| 2009/0291249 A1 | 11/2009 | Mehta et al. | |
| 2009/0320987 A1 | 12/2009 | Hubbard et al. | |
| 2010/0048752 A1 | 2/2010 | Vignola et al. | |
| 2010/0173112 A1 | 7/2010 | Wiercinski | |
| 2010/0179236 A1 | 7/2010 | Bosnyak et al. | |
| 2010/0227103 A1 | 9/2010 | Hohmann, Jr. | |
| 2011/0223410 A1 * | 9/2011 | Gencer | B29C 63/0017 |
| | | | 156/77 |
| 2011/0281094 A1 | 11/2011 | Zanchetta et al. | |
| 2012/0244340 A1 | 9/2012 | Peng et al. | |
| 2012/0247040 A1 | 10/2012 | Buoni et al. | |
| 2012/0266553 A1 * | 10/2012 | Shiao | E04D 3/357 |
| | | | 428/116 |
| 2013/0247490 A1 | 9/2013 | Strait | |
| 2013/0316157 A1 * | 11/2013 | Yang | E04D 5/148 |
| | | | 156/60 |
| 2014/0103563 A1 | 4/2014 | Gray et al. | |
| 2014/0141672 A1 | 5/2014 | Hubbard et al. | |
| 2014/0335321 A1 | 11/2014 | Reisman et al. | |
| 2015/0306850 A1 | 10/2015 | Hubbard et al. | |
| 2016/0229095 A1 | 8/2016 | Mori et al. | |
| 2016/0348286 A1 | 12/2016 | Arthurs | |
| 2017/0306628 A1 | 10/2017 | Simonis et al. | |
| 2017/0362830 A1 | 12/2017 | Buckingham et al. | |
| 2018/0054160 A1 * | 2/2018 | Krishnamoorthy | H02S 40/42 |
| 2018/0334814 A1 * | 11/2018 | Rashid | E04D 13/12 |
| 2019/0055734 A1 | 2/2019 | Lennox | |
| 2019/0106878 A1 * | 4/2019 | Alderman | F28D 20/025 |
| 2019/0255822 A1 * | 8/2019 | Wang | C08K 3/04 |
| 2019/0309519 A1 | 10/2019 | Folkerson et al. | |
| 2021/0317279 A1 | 10/2021 | Kalish et al. | |
| 2022/0055263 A1 | 2/2022 | Meree et al. | |

FOREIGN PATENT DOCUMENTS

| | | |
|---|---|---|
| WO | 2010/070466 A1 | 6/2010 |
| WO | 2013092691 | 6/2013 |
| WO | 2015/089384 A1 | 6/2015 |
| WO | 2020056243 A1 | 3/2020 |

* cited by examiner

COMPOSITE MEMBRANE FOR BUILDING APPLICATIONS

FIELD

This disclosure relates generally to roofing products. More particularly, this disclosure relates to a roofing membrane.

BACKGROUND

A single ply building membrane is a roofing membrane typically applied in the field using a one-layer membrane material (either homogeneous or composite) rather than multiple layers built-up, for instance, as with asphaltic shingles. The membranes can include one or more layers, have a top and bottom surface, and may include a reinforcing scrim or stabilizing material.

SUMMARY

This disclosure relates to a new and improved non-asphalt light weight sustainable composite material (e.g., 100% recyclable material) useful as building membranes for sloped roofing systems, siding, or other applications.

In some aspects of the present disclosure, building membranes, including roofing composite membranes, are provided that include: (a) a base layer comprising a first thermoplastic polyolefin, wherein a weight of the base layer is between 5 and 25 grams per square foot; and (b) a coating layer at least partially coating the base layer, wherein the coating layer comprises: (i) at least one inorganic additive and (ii) a second thermoplastic polyolefin comprising polypropylene, wherein the second thermoplastic polyolefin has a melt flow rate of 0.5-12 grams per 10 minutes as determined according to ASTM D1238 at 230° C.

In some embodiments, the second thermoplastic polyolefin further includes polyethylene.

In some embodiments, the second thermoplastic polyolefin includes at least 80 mol % polypropylene.

In some embodiments, the coating layer is characterized by a flexural modulus ranging from 5,000 to 175,000 psi as determined according to ASTM D790.

In some embodiments, the base layer is characterized by a tear strength ranging from 10 lbf to 30 lbf as determined according to ASTM D4533.

In some embodiments, the at least one inorganic additive is selected from the group consisting of colorants, and fire retardants.

In some embodiments, the at least one inorganic additive comprises one or more of $CaCO_3$, $Mg(OH)_2$, or $TiO_2$.

In some embodiments, the base layer includes a woven or nonwoven fabric.

In some embodiments, the roofing composite membrane further includes an adhesive layer in contact with the base layer. For example, the adhesive layer may include a butyl or acrylic hot melt, among many other possibilities.

In some embodiments, a combined thickness of the base layer and the coating layer ranges from 6 mils to 40 mils.

In some embodiments, a thickness of the base layer ranges from 3 mils to 20 mils.

In some embodiments, a thickness of the coating layer ranges from 3 mils to 20 mils.

In some embodiments, the base layer and the coating layer are joined in the absence of an adhesive or a tie layer.

In some embodiments, a width of the roofing composite membrane ranges from 0.25 feet to 8 feet.

In some aspects of the present disclosure, building membranes, including roofing composite membranes, are provided that include: a base layer comprising a polymeric material characterized by a tear strength ranging from 10 lbf to 30 lbf as determined according to ASTM D4533; and a coating layer at least partially coating the base layer, the coating layer including at least one inorganic additive and a first thermoplastic polyolefin comprising polypropylene, wherein the coating layer has a flexural modulus of up to 175,000 psi as determined according to ASTM D790.

In some embodiments, a weight of the base layer is 50 to 250 grams per square meter ($g/m^2$).

In some embodiments, the coating layer is characterized by a melt flow rate of 0.5-12 grams per 10 minutes as determined according to ASTM D1238 at 230° C.

In some embodiments, the base layer includes a second thermoplastic polyolefin.

In other aspects of the present disclosure, a sloped roofing system is provided that includes: (a) a roofing substrate and (b) a roofing composite membrane in accordance with any of the above aspects and embodiments.

In some embodiments, the roofing composite membrane may be secured to the roofing substrate by mechanical fasteners, by an adhesive, or both.

In other aspects of the present disclosure, methods of forming building membranes, including roofing composite membranes, are provided, which include: coextruding (a) a base layer comprising a first thermoplastic polyolefin, wherein said base is extruded in the form of a nonwoven fabric layer and (b) a coating layer including at least one inorganic additive and a second thermoplastic polyolefin comprising polypropylene, wherein the coating layer at least partially covers the base layer.

A roofing composite membrane is disclosed having a series of pockets, structural voids and/or other topology structural features that help promote increased structural integrity and resistance to impacts to the roofing composite membrane. The pockets or voids can be filled with air or other gases and sealed to create a series of discrete, spaced pockets or areas that are adapted to help cushion and dissipate energy from impact of hail, etc., striking the membrane. The air or gas filled pockets further can help provide increased thermal insulation values.

The roof membrane can be produced by laminating or coextruding a cover layer with a template sheet that contains a series of pockets or voids. The pockets of the template sheet can be extruded or formed with spaced recesses or pockets that can be formed as sealed structures when extruded, or can be open on one or both sides when initially formed and later sealed with the application of one or more covering sheets. Air or other gas can be injected within the voids or air pockets during extrusion of the template sheet, and/or during lamination of the template sheet with the one or more cover sheets.

Cover sheets further can be applied or laminated on one or both sides of the template sheet to create sandwiched construction. For example, a template sheet with a series of sealed air pockets or bubble structures can be located between a pair of cover sheets, and the entire structure laminated together to form a sealed structure with a series of spaced air pockets located therebetween. Still further, the template sheet and cover sheet(s) can be extruded or formed as a single or multilayer sheet with one or multiple layers of air pockets.

In additional embodiments, the template sheet can be configured as a geogrid having a lattice structure or with a mesh or honeycomb type structure. A series of recesses, cells or voids can be defined within the grid, mesh or honeycomb structures of the template sheet. These recesses, cells or voids further can be left open on at least one sides of the template sheet, with a cover sheet thereafter applied to at least one side so as to enclose and cover the recesses, cells or voids, and with the open side of the recesses cells or voids placed facing downwardly when the template sheet is installed for a roof substrate to define/create air pockets between the roof substrate and the roofing composite membrane.

The foregoing and various other features, aspects and advantages of the present disclosure will become further understood upon a review of the following detailed description, when taken in conjunction with the accompanying drawings.

BRIEF DESCRIPTION OF THE DRAWINGS

References are made to the accompanying drawings that form a part of this disclosure and which illustrate embodiments in which the devices and methods described herein can be practiced.

Like reference numbers represent like parts throughout.

DETAILED DESCRIPTION

Roofing composite membranes have become increasingly prevalent for use in commercial roof assemblies. Roofing composite membranes are generally thin, pliable sheets of material that typically can be made from synthetic rubbers, thermoplastics, or the like. Single-ply roofing composite membranes, however, previously have not been a preferred roofing material for use in steep slope type roofing assemblies such as, but not limited to, residential roof assemblies, as they typically do not provide a high level of impact resistance to hail and other objects and can be more susceptible to damage due to impact, such as being hit with hail of a significant size, leading to rupture of the roofing composite membranes. As a result, holes or perforations can be formed in the roofing composite membrane that can allow penetration or migration of water therethrough. Accordingly, it can be seen that a need exists for a roofing composite membrane that addresses the foregoing and other related and unrelated problems in the art.

As defined herein, a "roofing substrate" is a roof deck such as a plywood deck, a roof deck having insulation material (such as polyisocyanate) or equivalent.

Figure 1:
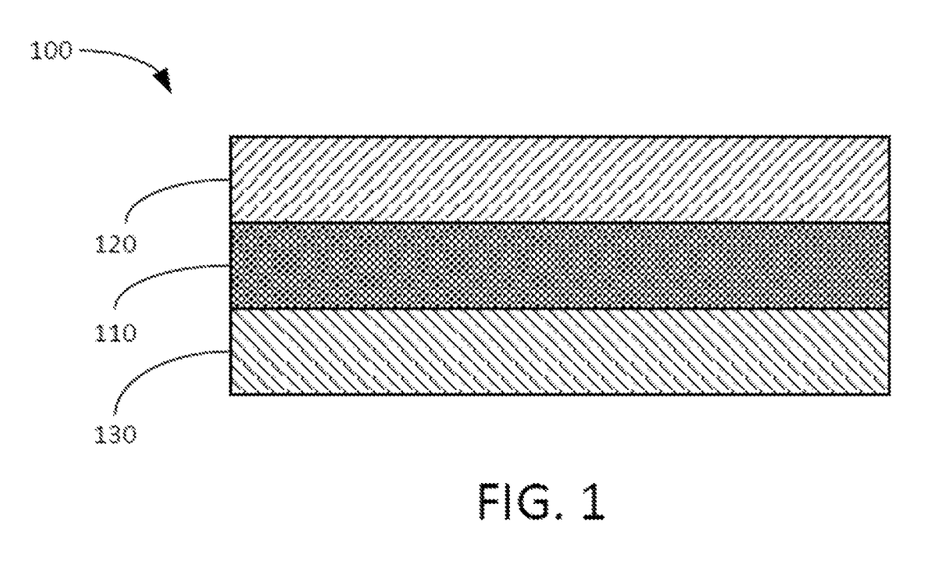
FIG. 1 is a schematic illustration of a layered composite membrane, in accordance with an embodiment of the present disclosure.

According to various aspects of the present disclosure, and with reference to FIG. 1, novel layered composite membranes 100 are provided which include a base layer 110, a coating layer 120 disposed over at least a portion of the base layer 110, and, in some embodiments, an adhesion layer 130.

In various embodiments, a combined thickness of the base layer 110 and the coating layer 120 of the layered composite membranes 100 may be less than or equal to 40 mils, less than or equal to 30 mils, and less than or equal to 20 mils in some embodiments. For example, the combined thickness of the base layer 110 and the coating layer 120 of the composite membrane 100 may range from 6 mils or less to 40 mils in some instances, ranging anywhere from 6 mils to 8 mils to 10 mils to 12 mils to 14 mils to 16 mils to 20 mils to 25 mils to 30 mils to 40 mils (in other words, ranging between and including any two of the preceding values).

The layered composite membranes 100 may vary in width, for example, ranging from 0.25 foot in width or less to 8 feet in width or more, for example, ranging anywhere from 0.25 foot to 0.5 foot to 1 foot to 2 feet to 4 feet to 6 feet to 8 feet.

In various embodiments, the base layer 110 is composed of a single layer or multiple sub-layers of woven or non-woven spunbond polymer, woven or non-woven fabric, metal foil, and combinations thereof.

In various embodiments, the base layer 110 may include a single thermoplastic layer or may include a plurality of thermoplastic polymer sub-layers. For example, the base layer may be formed from a single thermoplastic polymer or from two, three or more differing thermoplastic polymers. Thermoplastic polymers may be selected, for instance, from one or more of the following thermoplastic polyolefins (TPOs), among others: polyethylene, polypropylene, polybutene, ethylene/propylene copolymers, ethylene/butene copolymers, ethylene/hexene copolymers, ethylene/octene copolymers, terpolymers of ethylene, propylene and an additional monomer such as a non-conjugated diene (e.g., EPDM terpolymers), propylene-$C_{4-8}$ alpha-olefin copolymers, metallocene polyolefins, and so forth.

In addition to one or more thermoplastic polyolefins, the base layer 110 may include various additives such as fillers, pigments, fire retardants, and stabilizers, among others. For example, the base layer 110 may include additives in an amount ranging from 0.5 to 10 wt %, for example, ranging anywhere from 0.5 wt % to 1 wt % to 2 wt % to 4 wt % to 6 wt % to 8 wt % to 10 wt %, among other possibilities.

In some embodiments, the base layer 110 may be manufactured by a non-woven manufacturing process, for example, by an extrusion-based process such as an extrusion spinning process, whereby a spun bond layer may be formed. In other embodiments, the base layer 110 may be manufactured by weaving or knitting.

In various embodiments, a thickness of the base layer 110 may be less than or equal to 20 mils, less than or equal to 15 mils, or less than or equal to 10 mils in some embodiments. For example, the thickness of the base layer 110 may be from 3 mils or less to 15 mils or more, for example, ranging anywhere from 3 mils to 4 mils to 6 mils to 8 mils to 10 mils to 12 mils to 15 mils in some instances.

In various embodiments, the base layer 110 may have a tear strength of at least 10 lbf as determined according to ASTM D4533, for example, ranging from 10 lbf to 30 lbf, e.g., ranging anywhere from 10 lbf to 15 lbf to 20 lbf to 25 lbf to 30 lbf among other possibilities. In various embodiments, the base layer 110 may have a weight ranging from 50 $g/m^2$ to 250 $g/m^2$ per ASTM D5261, among other possibilities. In various embodiments, the base layer 110 have both a tear strength of at least 10 lbf as determined according to ASTM D4533 and a weight ranging from 50 $g/m^2$ to 250 $g/m^2$, for example, ranging anywhere from 50 $g/m^2$ to 60 $g/m^2$ to 70 $g/m^2$ to 80 $g/m^2$ to 90 $g/m^2$ to 100 $g/m^2$ to 110 $g/m^2$ to 120 $g/m^2$ to 130 $g/m^2$ to 140 $g/m^2$ to 150 $g/m^2$ to 175 $g/m^2$ to 200 $g/m^2$ to 225 $g/m^2$ to 250 $g/m^2$.

The use of a woven or non-woven polymeric fabric layer for the base layer 110 may provide, for example, dimensional stability and durability to the layered composite membrane 100. Alternatively or in addition, use of a woven or non-woven polymer fabric layer for the base layer 110 may also provide a property of good walkability to the layered composite membranes 100. Alternatively or in addition, the use of a woven or non-woven polymer fabric layer for the base layer 110 may provide enhanced uptake of adhesive material.

As noted above, in addition to a base layer 110, the layered composite membranes 100 of the present disclosure further include a coating layer 120 disposed over at least a portion of the base layer 110.

In various embodiments, the coating layer 120 includes one or more thermoplastic polymers and one or more additives selected from (a) at least one organic additive, (b) at least one inorganic additive, or (c) a combination of (a) and (b).

In various embodiments, the coating layer 120 may be formed from a single thermoplastic polymer or from two, three, or more differing thermoplastic polymers. Thermoplastic polymers for the coating layer 120 may be selected, for instance, from one or more of the following thermoplastic polyolefins, among others: polyethylene, polypropylene, polybutene, ethylene/propylene copolymers, ethylene/butene copolymers, ethylene/hexene copolymers, ethylene/octene copolymers, terpolymers of ethylene, propylene and an additional monomer such as a non-conjugated diene (e.g., EPDM terpolymers), propylene-$C_{4-8}$ alpha-olefin copolymers, metallocene polyolefins, and so forth. Such polyolefins can be virgin or recycled materials.

In some embodiments, the coating layer 120 includes one or more thermoplastic polyolefins that include a propylene-based thermoplastic polyolefin selected from (i) polypropylene and (ii) copolymers of propylene with ethylene or with a $C_{4-8}$ alpha-olefin (e.g., ethylene/propylene copolymers, propylene/butene copolymers, propylene/hexene copolymers, propylene/octene copolymers, etc.). In some embodiments, the coating layer 120 further includes one or more additional thermoplastic polyolefins, which may be selected from those listed above.

For example, in certain embodiments, the one or more thermoplastic polyolefins may include (a) a propylene-based thermoplastic polyolefin in an amount ranging anywhere from 50 wt % to 60 wt % to 70 wt % to 80 wt % to 85 wt % to 90 wt % to 95 wt % to 97.5 wt % to 98 wt % to 99 wt % to 100 wt %, and (b) one or more additional thermoplastic polyolefins in an amount ranging anywhere from 50 wt % to 40 wt % to 30 wt % to 20 wt % to 15 wt % to 10 wt % to wt % to 5 wt % to 2.5 wt % to 2 wt % to 1 wt % to 0.01 wt % to 0 wt %. In particular embodiments, the one or more additional thermoplastic polyolefins include polyethylene.

In various embodiments, the propylene-based thermoplastic polyolefin may have a melt flow rate of 0.5-12 grams per 10 minutes, for example, ranging anywhere from 0.5 grams per 10 minutes to 1 grams per 10 minutes to 2 grams per 10 minutes to 4 grams per 10 minutes to 6 grams per 10 minutes to 8 grams per 10 minutes to 10 grams per 10 minutes to 12 grams per 10 minutes, as determined according to ASTM D1238 at 230° C. In various embodiments, the propylene-based thermoplastic polyolefin may have a flexural modulus of up to 175,000 psi, for example, ranging from 5,000 psi to 175,000 psi, e.g., ranging anywhere from 5,000 psi to 10,000 psi to 25,000 psi to 50,000 psi to 75,000 psi to 100,000 psi to 125,000 psi to 150,000 psi to 175,000 psi as determined according to ASTM D790. In various embodiments, the propylene-based thermoplastic polyolefin may have both a melt flow rate of 0.5-12 grams per 10 minutes as determined according to ASTM D1238 at 230° C. and a flexural modulus of up to 175,000 psi as determined according to ASTM D790.

Inorganic additives for use in the coating layer 120 may be selected, for example, from colorants, fire retardants, and combinations thereof. Organic additives for use in the coating layer 120 may be selected, for example, from antioxidants, ultraviolet light stabilizers, thermal stabilizers, and combinations thereof. Non-limiting examples of inorganic additives for use in the coating layer 120 include one or more of $CaCO_3$, $Mg(OH)_2$, or $TiO_2$.

In various embodiments, the coating layer 120 may include additives (inorganic, organic or combinations thereof) in an amount ranging from 5 to 50 wt %, among other possibilities, for instance, ranging anywhere from 5 wt % to 10 wt % to 15 wt % to 20 wt % to 25 wt % to 30 wt % to 40 wt % to 50 wt %.

In various embodiments, a thickness of the coating layer 120 may be less than or equal to 20 mils, and less than or equal to 10 mils in some embodiments. For example, the thickness of the coating layer 120 may be from 3 mils or less to 20 mils, for example, ranging anywhere from 3 mils to 4 mils to 5 mils to 6 mils to 8 mils to 10 mils to 12 mils to 15 mils to 20 mils.

In various embodiments, the coating layer 120 may have a melt flow rate of 0.5-12 grams per 10 minutes, for example, ranging anywhere from 0.5 grams per 10 minutes to 1 grams per 10 minutes to 2 grams per 10 minutes to 4 grams per 10 minutes to 6 grams per 10 minutes to 8 grams per 10 minutes to 10 grams per 10 minutes to 12 grams per 10 minutes, as determined according to ASTM D1238 at 230° C. In various embodiments, the coating layer 120 may have a flexural modulus of up to 175,000 psi, for example, ranging from 5,000 psi to 175,000 psi, e.g., ranging anywhere from 5,000 psi to 10,000 psi to 25,000 psi to 50,000 psi to 75,000 psi to 100,000 psi to 125,000 psi to 150,000 psi to 175,000 psi as determined according to ASTM D790. In various embodiments, the coating layer 120 may have both a melt flow rate of 0.5-12 grams per 10 minutes as determined according to ASTM D1238 at 230° C. and a flexural modulus of up to 175,000 psi as determined according to ASTM D790.

In various embodiments, the coating layer 120 may be provided with one or more aesthetic markings. Aesthetic markings may be provided on the coating layer 120, for example, via printing, reverse printing, monolithic pigment coloring, incomplete pigment mixing, extrusion or embossing. For example, the print pattern can be ordered metal standing seam or non-ordered pattern such as random granite, embossed patterns.

The use of a coating layer 120 like that described herein may provide the layered composite membranes 100 with properties of long term waterproofing and weathering resistance, as well as color in some cases.

The coating layer 120 may be formed by an extrusion-based process. As previously indicated, a base layer 110 such as a polymer fabric layer may be manufactured by a non-woven process such as by an extrusion-based process or may be manufactured by weaving or knitting.

This opens a range of manufacturing techniques for the layered composite membranes 100 of the present disclosure. For example, layered composite membranes 100 may be formed by extruding or laminating a base layer 110 onto a preformed coating layer 120. As another example, the layered composite membranes 100 may be formed by extruding a coating layer 120 onto a previously formed base layer 110. As another example, a base layer 110 may be co-extruded along with a coating layer 120. As yet another example, a base layer 110 and a coating layer 120 may be independently formed and then bonded together, for example by partially melting the base layer 110, the coating layer 120, or both.

In each of the foregoing processes, base layer 110 and the coating layer 120 can joined in the absence of an adhesive layer or a tie layer.

Using these and other techniques, layered composite membranes 100 may be formed in varying widths, including those indicated above.

As noted above, in addition to a base layer 110 and a coating layer 120, the layered composite membranes 100 of the present disclosure may further include, in some embodiments, an adhesive layer 130. Where an adhesive layer 130 is provided, the layered composite membrane 100 may be, for example, a self-adhered layered composite membrane 100. In various embodiments, the adhesive layer 130 is positioned adjacent to the base layer 100 on a side of the based layer 100 that is opposite to that of the coating layer 120 as shown in FIG. 1.

Where present, the adhesive layer 130 may cover the base layer 110 in its entirety. Alternatively, the adhesive layer 130 may be provided in an adhesive pattern such as a random pattern, grid pattern, chevron pattern, spiral pattern, stripe pattern, and so forth.

Specific examples of materials for the adhesive layer 130 include hot melt adhesives such as butyl hot melt adhesives and acrylic hot melt adhesives, water-dispersed adhesives, and solvent based adhesives. In various embodiments, the adhesive layer 130 may be protected by a peelable layer that can be readily removed from the adhesive layer 130 at the time of installation. Such layered composite membranes 100 may be installed by a "peel-and-stick" application process.

The present disclosure is also directed to roofing systems that include a layered composite membrane 100 in accordance with the present disclosure and a roofing substrate. Layered composite membranes 100 in accordance with the present disclosure may be installed onto roofing substrates, for example, by mechanical or adhesive attachment.

In some embodiments, adhesives may be applied to layered composite membranes 100 in accordance with the present disclosure at the installation site. Adhesives may be applied, for example, by roller, brush, spray, adhesive spreader, or application with static charge, among other techniques. Non-limiting examples of adhesives for these methods include, for instance, neoprene solvent-based adhesives, acrylic water-based adhesives, silane-based adhesives, high-solid adhesives, one- and two-part polyurethane adhesives, hot melt adhesives, and/or tape adhesives, among others.

In some embodiments, the layered composite membranes 100 in accordance with the present disclosure may already be provided with an adhesive layer 130 at the time of manufacture (and thus at the installation site).

In some embodiments, layered composite membranes 100 in accordance with the present disclosure may also be installed by mechanical attachment. For example, the layered composite membranes 100 may be mechanically attached to a building structure by screw plate, hook, loop and/or wood, metal and plastic batten strips.

Layered composite membranes 100 in accordance with the present disclosure are advantageous in that they are lightweight and are easy to carry onto a building structure, particularly onto a sloped roofing system.

Layered composite membranes 100 in accordance with the present disclosure can be installed horizontally across the roof (similar to asphaltic shingles) or can be installed vertically up and down the roof.

Because layered composite membranes 100 in accordance with the present disclosure can be manufactured in wide widths, the number of horizontal and/or vertical joints in the roofing system can be reduced, which can reduce installation time and improve the water-shedding capability of the system.

Layered composite membranes 100 in accordance with the present disclosure are advantageous in that they are simple to install and do not require special tools, equipment, or extensive training.

Accordingly, the layered composite membranes 100 may deliver significant cost savings and shortened installation times over conventional asphaltic shingle roofing systems, while providing excellent weathering resistance.

The above and other features will become apparent from the Examples to follow.

One specific formulation for a 6 mil coating layer was made of 100 parts of blend of polypropylene copolymers and polyethylene. Other ingredients including 2-8 parts UV and thermal stabilizers master batch, 1-5 parts color concentrate and 15-50 parts calcium carbonate. The ingredients were mixed in an extruder at 170° C. and extruded through a sheet die at 235° C. on a 6-mil base layer at 96 g/m$^2$ weight to form a 12 mil layered composite membrane. The layered composite membrane then was tested for installation (time and motion study), weathering (wind driven rain and hail), and aging properties. The test results are detailed below.

Example 1. Time and Motion Study

Roofing materials were installed on outdoor roofing decks at a temperature of about 38° F. The deck size was 16'×24' and at 4:12 slope. On a first deck, control asphalt shingles were mechanically applied.

Figure 2A:
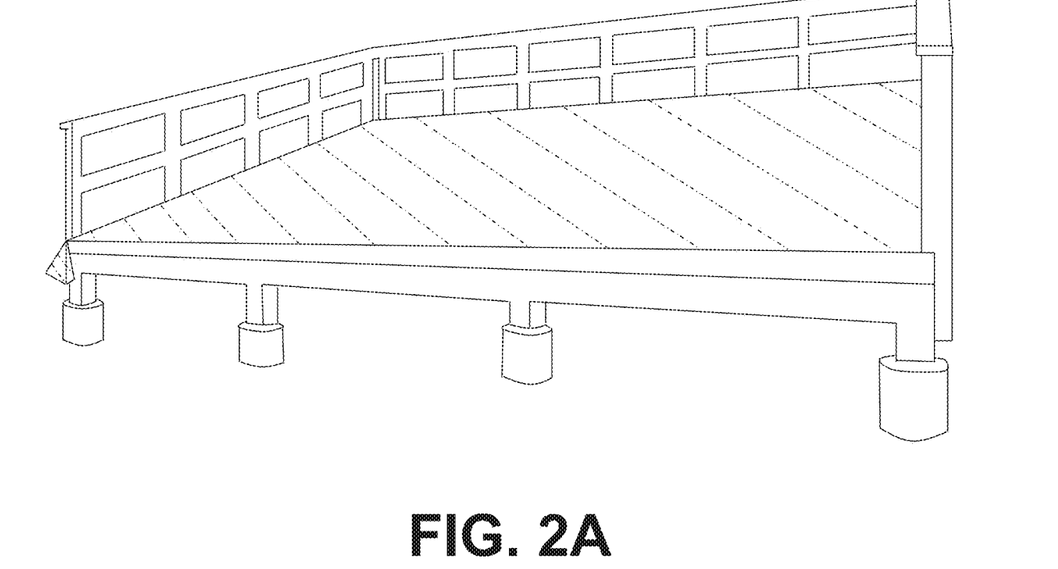
FIGS. 2A and 2B show a batten at eave (installation) of a layered composite membrane, in accordance with an embodiment of the present disclosure.
Figure 2B:
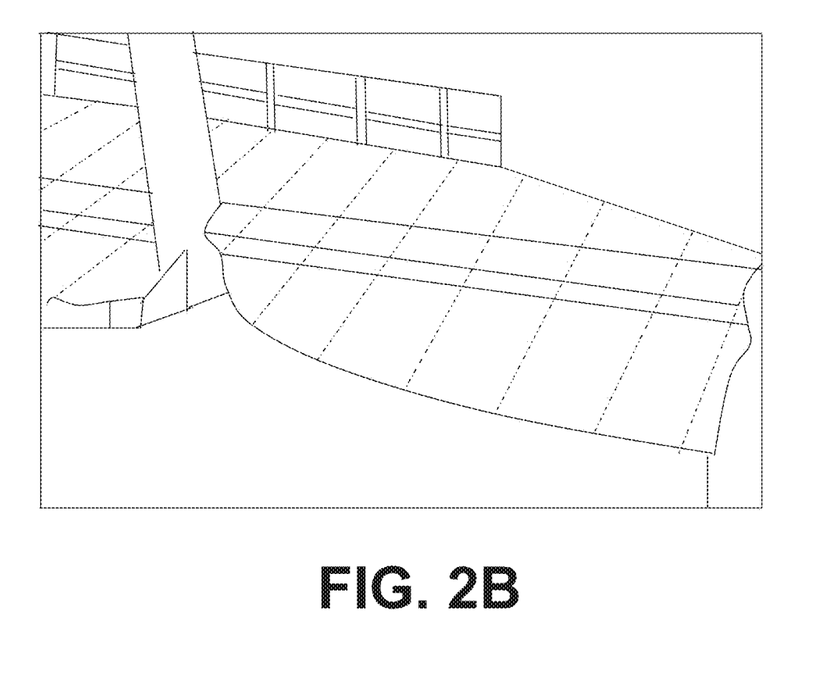

On a second deck, an 8' layered composite membrane in accordance with the present disclosure and wood battens for mechanical attachment were applied horizontally by a 3-person team. More particularly, the layered composite membrane was installed with batten at eave (BAE) as a first course option, which requires a drip edge at the eave of the structure. See, e.g., FIG. 2A (front view) and FIG. 2B (eave view). In this case, the short course at the ridge would have required cutting the 8' width material down to an 8" width. Accordingly, a 4' width material was used instead.

On a third deck, a 4' layered composite membrane in accordance with the present disclosure was applied in a like manner.

Figure 3:
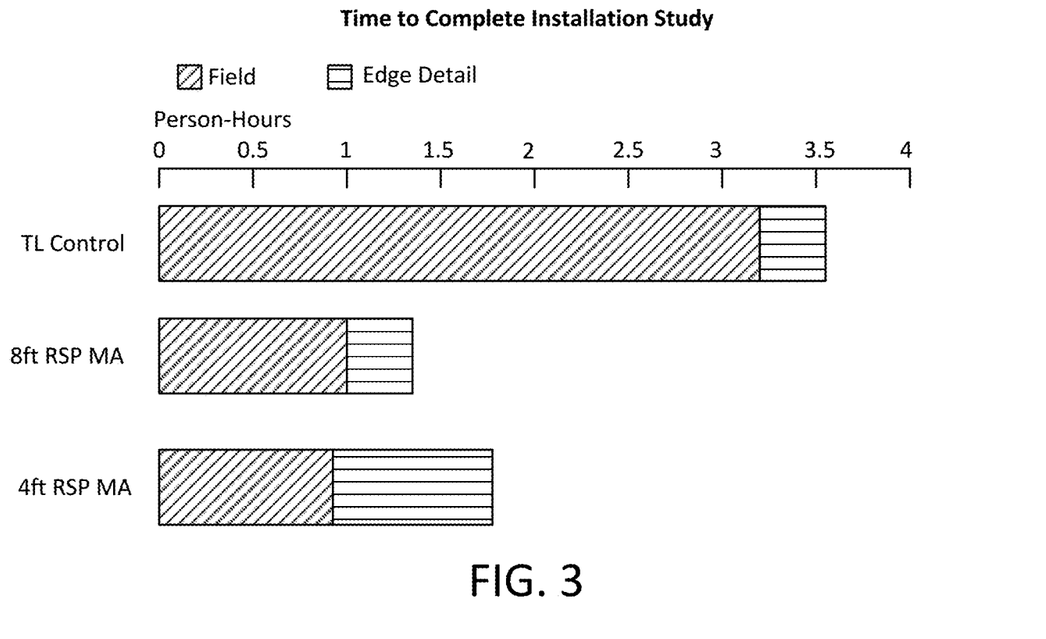
FIG. 3 illustrates time to completion for an asphalt shingle deck installation and two deck installations using layered composite membranes in accordance with the present disclosure.

Time to completion for each of these systems are shown in FIG. 3, which shows a significant overall time savings for the 8' layered composite membrane (8 ft RSP MA) in accordance with the present disclosure and the 4' layered composite membrane (4 ft RSP MA) in accordance with the present disclosure, relative to the asphalt shingle installation (TL Control), particularly in the field portion of the installation. In this time-motion study, the inventive 8' & 4' wide layered composite membrane shows >50% installation time saving over conventional asphalt shingles.

Once commercially available, significant material cost savings are expected for layered composite membranes in accordance with the present disclosure as well.

Example 2. Wind Driven Rain Testing

The wind driven rain resistance testing was performed by mimicking industry standard ASTM D3161 Standard Test Method for Wind-Resistance of Steep Slope Roofing Products (Fan-Induced Method) and Miami Dade County TAS 100A-95 for a layered composite membrane mounted on 4'×5' plywood deck in accordance with the present disclosure at a 2:12 slope. Two installation methods were tested: mechanically attached with wood batten and peel-and-stick adhered product design. The standard testing of wind blowing calls for 15 minutes at 35 mph, 70 mph, and 90 mph respectively followed by 5 minutes at 110 mph. In each case, the residential single ply (RSP) installation passed the 110 mph rating.

Example 3. Hail Impact Resistance Study

The hail impact resistance of a layered composite membrane in accordance with the present disclosure was measured by mimicking industry standard FM Approvals (FM) 4473 Test Standard of Impact Resistance of Testing of Rigid Roofing Materials by impacting with Freezer Ice Balls in a small scale test and Underwriters Laboratories (UL) 2218 Standard for Impact Resistance of Prepared Roof Covering Materials, with the layered composite membrane providing a Class 3 rating. It is superior to asphalt shingle.

Example 4. Aging Study

The 12-mil layer composite membrane was exposed outdoor in PA. Compared to a 10-mil retailed plastic tarp, the layer composite membrane remains 100% breaking strength retention and no surface cracking while the green tarp shows surface cracking after 7-month outdoor exposure.

The inventive composite membrane was tested in artificial accelerated Xenon Arc Weather-O-Meter per ASTM D6878/ G155. The 12-mil thermoplastic polyolefin composite membrane passes 6,300 KJ/nm·m² without 7× surface cracking. The 15-mil posted-consumer recycled PP (KW Plastics KW308A) top coated membrane passes 20,000 KJ/nm·m² without 7× surface cracking.

Table 1 illustrates a comparison of physical properties between asphaltic shingle roof materials versus the inventive composite membrane described herein.

TABLE 1

| Building Material Properties | Test Method | Conventional Roof Cover Asphalt Shingles | Inventive Example Polyolefin Composite Membrane |
|---|---|---|---|
| Thickness (mils) | ASTM D751 | ≥100 | 12 |
| Weight (g/SF) | ASTM D751 | >317 | 18.5 |
| Weather Resistance | AC 438*/ASTM G155 @ Irradiance: 0.70 W/m² @ 340 nm | >2000 hrs, no visual surface crack | >2333 hrs, no surface crack with 7× magnification |
| Roof Installation Method | | Mechanical nailing | Mechanical attached & Peel & Stick self-adhered |
| Wind-driven Rain Resistance | AC 438/TS-100** | Pass at 2:12 | Pass at 110 mph wind @2&1/2 Slope |

*AC 438 (International Code Council) - Acceptance Criteria For Alternative Asphalt Roofing Shingles
**Florida Building Code Test Protocol TAS-100

As can be seen in Table 1, the inventive material provides weight reductions and can be installed in a relatively shorter time while meeting or exceeding the capabilities of a conventional roofing material such as asphalt shingles.

Figure 4:
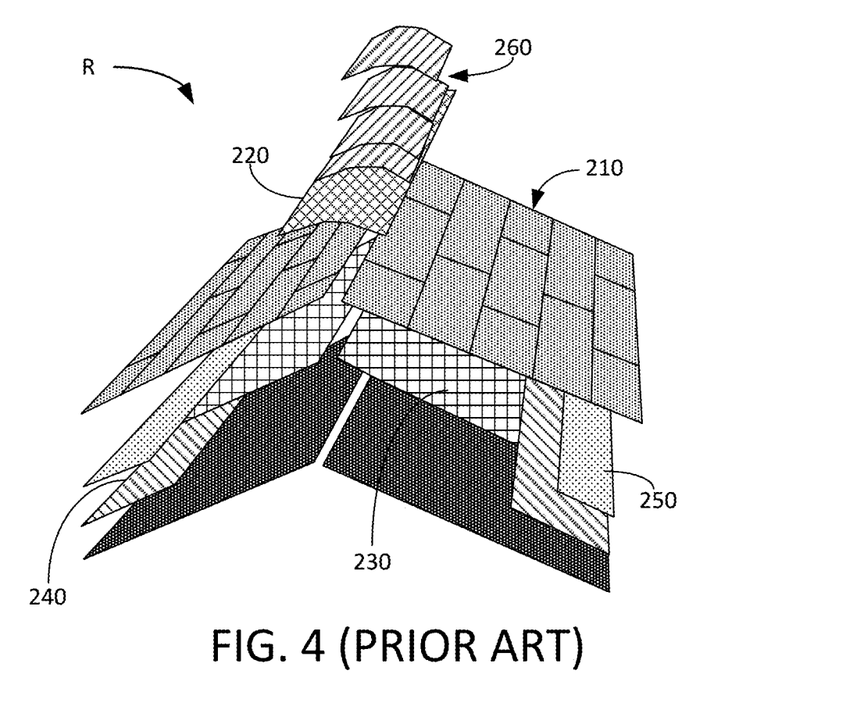
FIG. 4 is a perspective view generally illustrating a prior art steep or pitched roof structure.

FIG. 4 generally illustrates a pitched or steep sloped roof structure R, such as commonly used or found with residential roofing systems. For example, the roof structure can include decking panels mounted along rafters or roof beams that are pitched at an angle, with shingles 210, a roof cap 220, deck protection sheets 230, and leak barrier sheets 240 applied thereover. Starter shingles 250 and roof cap shingle 260 also can be applied to complete the roofing structure. The roofing composite membrane of the present disclosure generally will be applied over the deck panels as a replacement for asphalt shingles as an alternative to the use of shingles to provide a substantially watertight, sealed covering for steep slope roofing structures.

Figures 5A, 5B:
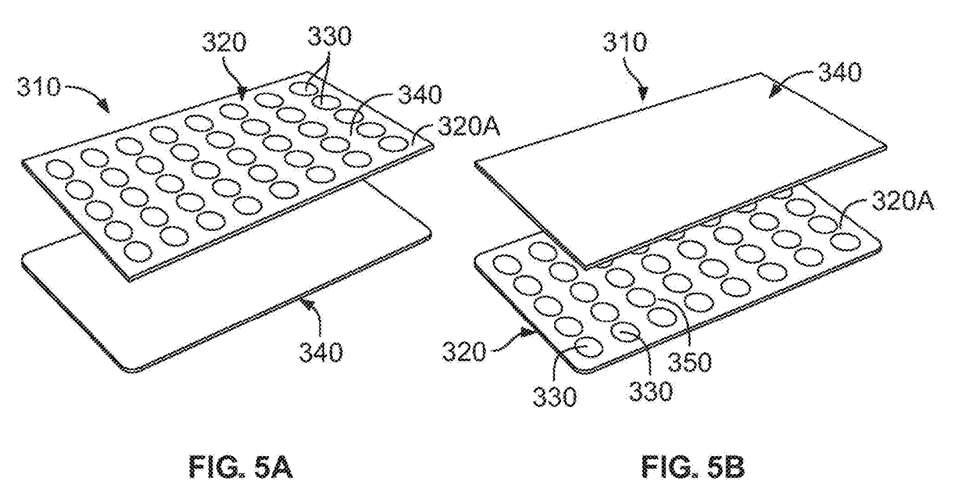
FIGS. 5A-5B are perspective views of a roof membrane, in accordance with an embodiment of the present disclosure.

As shown in FIGS. 5A and 5B, in one embodiment, the roofing composite membrane 310 can include a template sheet 320 that is configured with a series of spaced pockets, voids, or chambers 330. The template sheet 320 can be extruded from a plastic or synthetic material, although other materials such as rubber, paper, cardboard, metals such as metal foils, as well as non-woven materials also can be used. The pockets 330 can be formed or extruded as part of the template sheet 320 and filled with air, gas or other fluid media sufficient to provide a cushioning or dampening effect. For example, the pockets 330 can be filled with air or gas sufficient to form bubbles or inflated structures of a desired size, but which are also compressible in response to impacts to enable the pockets 330 to absorb and dissipate energy from impact of hail and other objects therewith. The pockets 330 can be formed of varying shapes or configurations, including pockets 330 that are substantially square or rectangular in shape, or which are hemi-spherical or elliptical in configuration. For example, the pockets 330 can be formed with a square shape with width and length dimensions ranging from 1 mm-100 mm and a height of between 1 mm-100 mm, as a rectangle with a length of between 1 mm-1000 mm and a width of 1 mm-100 mm or more and a height of 1 mm-100 mm; or with a diameter of 1 mm-1000 mm and a height of 1 mm-100 mm. In addition, the template sheet 320 may be extruded or formed as a single or multi-layer sheet with a series of air bubbles, pockets or cushion areas formed on one or both sides of the template sheet and/or the template sheet including multiple layers or rows of pockets or bubbles. Still further, the template sheet 320 could be forms with pockets or bubbles that are interconnected to enable passage of air therebetween to help facilitate energy dissipation and redistribution of force from impacts.

The roofing composite membrane 310 further generally can include one or more cover sheets 340 applied to the template sheet 320. The template sheet 320 and one or more cover sheets 340 can be coextruded together, or the cover sheets 340 can be laminated to the template sheet 320 along one or more sides thereof. The cover sheet(s) 340 can include materials such as thermoplastic polyolefin (TPO), polyvinylchloride (PVC) and hot melt thermoplastics and/or thermoset materials. The template sheet 320 further can be extruded or otherwise formed with recesses or pockets that are open ended on one or both sides, and which are sealed with air trapped therein during the lamination or application of the cover sheet(s) to the template sheet 320. In addition or as a further alternative, air or gas can be introduced into the pockets after formation and/or after application of the cover sheet(s) 340 to the template sheet 320.

As further illustrated in FIGS. 5A and 5B, the air pockets or bubbles 330 generally can be formed or arranged at spaced, discrete locations along the template sheet 320. The spacing of the pockets 330 can vary in both longitudinal and lateral directions, depending on use with, for example, the area of the air pockets comprising approximately 30% of the area of the template sheet 320, although greater or lesser projected area percentages also can be utilized. In addition, the cover sheet 340 generally will be applied over the side 320A of the template sheet 320 along which the air pockets 330 are formed, to create a roofing composite membrane 310 with a sandwich construction with the air pockets 330 being sandwiched between the template sheet 320 and cover sheet 340, and having a thickness of at least about $\frac{1}{16}$" to $\frac{1}{2}$" and up to 6'.

This sandwich construction can help provide further stability to the pockets 330, to help support and protect the pockets during impacts, and also creates spaces or open areas 350 surrounding the pockets 330 and in which air is trapped between the template sheet 320 and cover sheet 340. The trapping of air within the pockets 330 and within the open spaces 350 between the template 320 and cover sheets 340 further can help provide increased thermal insulation properties to the roofing composite membrane 310.

The roofing composite membrane 310 accordingly will be configured with a series of integrated, spaced, discrete air pockets, bubbles or other structural features/areas that absorb and dissipate energy from impact. For example, the air pockets can be configured so as to be compressible to a desired amount or degree to help absorb shock or force generated by the impact from hail or other objects striking the roofing composite membrane. As a result, the potential for damage to the roofing composite membrane due to impacts from hail or other objects can be reduced by the integrated cushioning and energy dissipation provided internally within the roofing composite membrane.

Figure 6:
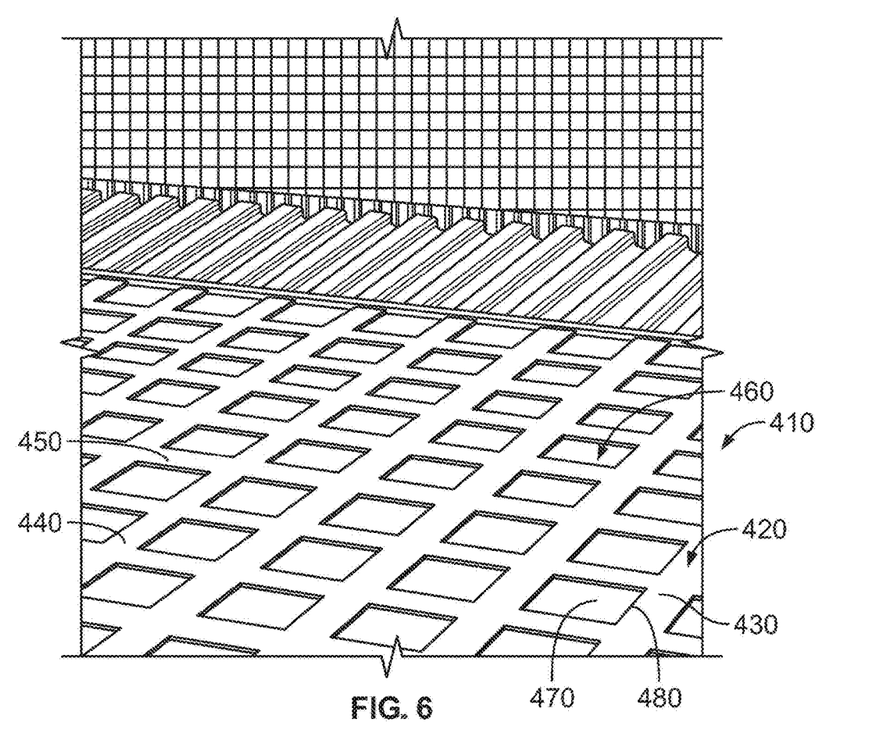
FIG. 6 is a perspective view of an additional embodiment of a roof membrane that embodies and exemplifies the principles of the present disclosure.

A further embodiment of the roofing composite membrane 410 is illustrated in FIG. 6. In this embodiment, the template sheet 420 of the roofing composite membrane 410 can be formed with a grid or geogrid type structure 430. For example, the template sheet 420 can be formed with a series of intersecting longitudinally and laterally extending ribs 440, 450. The ribs 440, 450 will be spaced both longitudinally and laterally to define a series of voids or recesses 460 therebetween. As also illustrated in FIG. 6, these voids or recesses 460 can be substantially square voids or recesses that can be closed at one end 470 and open at a top or upper end 480. It also will be understood by those skilled in the art that while a substantially square construction is shown for the recesses or voids, other configurations, including circular, substantially diamond or rectangular shapes, etc., also can be used.

The template sheet 420 can be covered with an additional covering or protective layer, which also further can be covered with an outer covering or layer as further illustrated in FIG. 6 so that its voids or recesses are sealed with air trapped therein by these covering layers. Alternatively, the grid configured template sheet 420 could be applied in a downwardly facing attitude, with the open ends 480 of its voids or recesses 460 facing toward the roofing panel on which the roofing composite membrane is overlaid and thus being enclosed or sealed to define a series of air pockets or bubbles between the membrane and supporting roofing panels.

Figure 7:
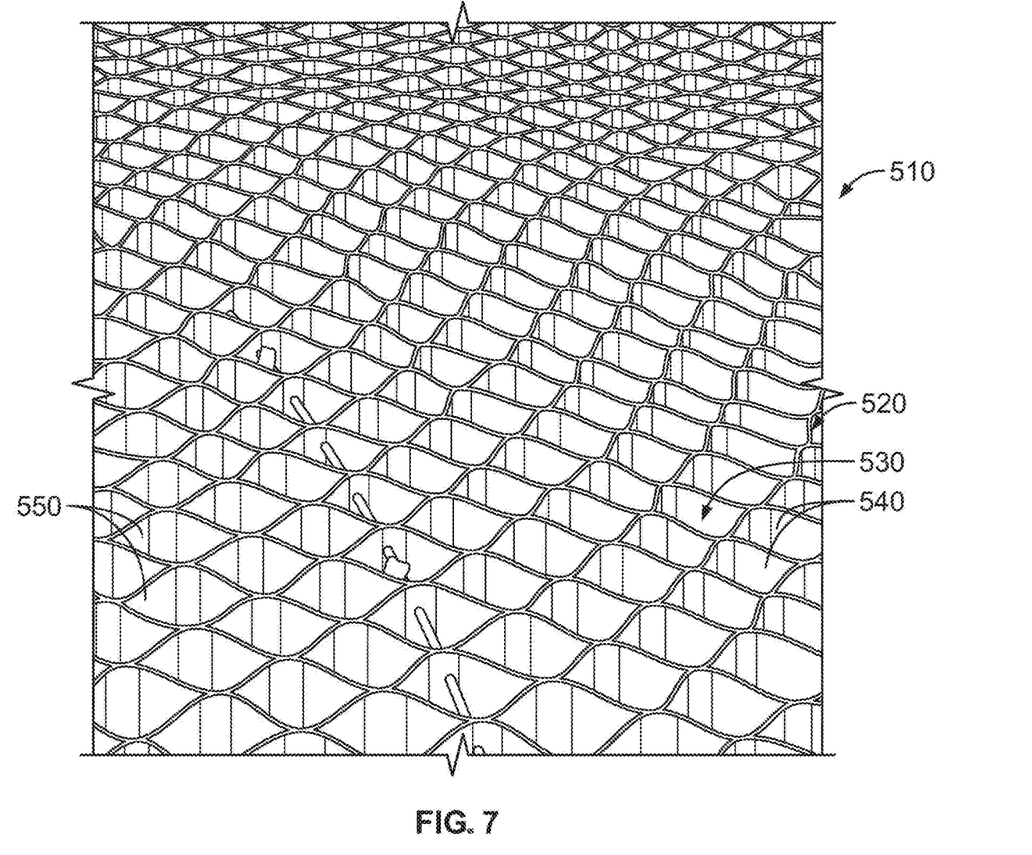
FIG. 7 is a perspective view of still another embodiment of a roof membrane that embodies and exemplifies the principles of the present disclosure.

A still further embodiment of a roofing composite membrane 510 is illustrated in FIG. 7. In FIG. 7, the template sheet 520 of the roofing composite membrane 510 is shown as being configured with a honeycomb or mesh type of construction 530, with a series of walls 540 defining open-ended recesses, channels, voids or passages 550. The template sheet 520 generally can be configured as a mesh or honeycomb structure having a thickness of at least 10-60 mils or greater, with structural walls that can range in thickness from 0.05" up to several (e.g. 3"-6" or greater) inches in thickness. In some embodiments, the template sheet could be formed as a panel or similar structure with a thicknesses of up to 6" or greater. The template sheet 520 further can be formed from materials such as plastics, including polyethylene, polypropylene, and PVC, as well as rubber materials, metal, paper, cardboard, and non-woven materials. The honeycomb or mesh structure can be sealed with the application of one or more covering sheets so as to create a series of sealed air pockets or voids having air trapped therein and separated by upstanding mesh walls that can provide further crush or impact resistance.

Embodiments

Embodiment 1. A roofing composite membrane, comprising: a base layer comprising a first thermoplastic polyolefin, wherein a weight of the base layer is between 5 and 25 grams per square foot; and a coating layer at least partially coating the base layer, wherein the coating layer comprises: at least one inorganic additive and a second thermoplastic polyolefin comprising polypropylene, and wherein the second thermoplastic polyolefin has a melt flow rate of 0.5-12 grams per 10 minutes as determined according to ASTM D1238 at 230° C.

Embodiment 2. The roofing composite membrane of embodiment 1, wherein the second thermoplastic polyolefin further comprises polyethylene.

Embodiment 3. The roofing composite membrane of embodiment 2, wherein the second thermoplastic polyolefin comprises at least 80 mol % polypropylene.

Embodiment 4. The roofing composite membrane of any of embodiments 1-3, wherein the coating layer is characterized by a flexural modulus ranging from 5,000 to 175,000 psi as determined according to ASTM D790.

Embodiment 5. The roofing composite membrane of any of embodiments 1-4, wherein the base layer is characterized by a tear strength ranging from 10 lbf to 30 lbf as determined according to ASTM D4533.

Embodiment 6. The roofing composite membrane of any of embodiments 1-5, wherein the at least one inorganic additive is selected from the group consisting of colorants, and fire retardants.

Embodiment 7. The roofing composite membrane of any of embodiments 1-6, wherein the at least one inorganic additive comprises one or more of $CaCO_3$, $Mg(OH)_2$, or $TiO_2$.

Embodiment 8. The roofing composite membrane of any of embodiments 1-7, wherein the base layer comprises a woven or nonwoven fabric.

Embodiment 9. The roofing composite membrane of any of embodiments 1-8, further comprising an adhesive layer in contact with the base layer.

Embodiment 10. The roofing composite membrane of embodiment 9, wherein the adhesive layer comprises a butyl, styrene, or acrylic hot melt.

Embodiment 11. The roofing composite membrane of any of embodiments 1-10, wherein a combined thickness of the base layer and the coating layer ranges from 6 mils to 40 mils.

Embodiment 12. The roofing composite membrane of any of embodiments 1-11, wherein a thickness of the base layer ranges from 3 mils to 20 mils.

Embodiment 13. The roofing composite membrane of any of embodiments 1-12, wherein a thickness of the coating layer ranges from 3 mils to 20 mils.

Embodiment 14. The roofing composite membrane of any of embodiments 1-13, wherein the base layer and the coating layer are joined in the absence of an adhesive or tie layer.

Embodiment 15. The roofing composite membrane of any of embodiments 1-14, wherein a width of the roofing composite membrane ranges from 0.25 feet to 8 feet.

Embodiment 16. A roofing composite membrane, comprising: a base layer comprising a polymeric material characterized by a tear strength ranging from 10 lbf to 30 lbf as determined according to ASTM D4533; and a coating layer at least partially coating the base layer, the coating layer comprising at least one inorganic additive and a first thermoplastic polyolefin comprising polypropylene, wherein the coating layer has a flexural modulus of up to 175,000 psi as determined according to ASTM D790.

Embodiment 17. The roofing composite membrane of embodiment 16, wherein a weight of the base layer is 50 to 250 grams per square meter.

Embodiment 18. The roofing composite membrane of any of embodiments 16-17, wherein the coating layer is characterized by a melt flow rate of 0.5-12 grams per 10 minutes as determined according to ASTM D1238 at 230° C.

Embodiment 19. The roofing composite membrane of any of embodiments 16-18, wherein the base layer comprises a second thermoplastic polyolefin.

Embodiment 20. A method of forming a roofing composite membrane, comprising coextruding (a) a base layer comprising a first thermoplastic polyolefin, wherein said base is extruded in the form of a nonwoven fabric layer and (b) a coating layer comprising at least one inorganic additive and a second thermoplastic polyolefin comprising polypropylene, wherein the coating layer at least partially covers the base layer.

Embodiment 21. A sloped roofing system comprising: a roofing substrate and a roofing composite membrane in accordance with embodiment 1.

Embodiment 22. The sloped roofing system of embodiment 21, wherein the roofing composite membrane is secured to the roofing substrate by mechanical fasteners, by an adhesive, or both.

Embodiment 23. A sloped roofing system comprising a roofing substrate and a roofing composite membrane in accordance with embodiment 16.

Embodiment 24. The sloped roofing system of embodiment 23, wherein the roofing composite membrane is secured to the roofing substrate by mechanical fasteners, by an adhesive, or both.

Embodiment 25. A method of forming a roofing composite membrane, comprising extruding (a) a coating layer comprising at least one inorganic additive and a second thermoplastic polyolefin comprising polypropylene on (b) a base layer comprising a first thermoplastic polyolefin, wherein said base is extruded in the form of a nonwoven fabric layer and wherein the coating layer at least partially covers the base layer.

Embodiment 26. A roofing composite membrane with enhanced impact resistance and an energy dissipating construction embodied in the examples described and illustrated herein.

Embodiment 27. A method of installing a roofing composite membrane having enhanced energy dissipation and impact resistance properties as embodied in the examples described and illustrated herein.

Conventional terms in the fields of materials science and engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawing, which form a part of the detailed description. The drawing shows, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Any and all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A roofing system, comprising:
a steep sloped roof comprising a substrate;
a roofing composite membrane installed on the substrate, wherein the roofing composite membrane comprises:
a first layer comprising a polymer material;
wherein the first layer further comprises a plurality of pockets spaced along at least one side thereof;
a second layer covering the first layer, thereby to form a plurality of closed pockets; and
a gas trapped within the plurality of closed pockets, thereby to form a plurality of gas-filled pockets;
a roofing shingle installed directly on the roofing composite membrane
wherein the roofing shingle is an outermost layer and; and
wherein the roofing shingle is exposed to environment.

2. The roofing system of claim 1, wherein the roofing composite membrane is configured to absorb and dissipate energy from an object impacting the roofing composite membrane sufficient to exhibit an impact resistance of at least a class 3 rating as measured according to UL 2218 Test Standard for Impact Resistance of Prepared Roof Covering Materials.

3. The roofing system of claim 1, wherein the gas comprises air.

4. The roofing system of claim 1, wherein the second layer comprises at least one of thermoplastic polyolefin (TPO) or polyvinylchloride (PVC).

5. The roofing system of claim 1, wherein the second layer comprises at least one of a thermoplastic or a thermoset.

6. The roofing system of claim 1, wherein each of the gas-filled pockets of the plurality of gas-filled pockets has a circular shape, diamond shape, square shape, or rectangular shape.

7. The roofing system of claim 1, wherein the roofing composite membrane comprises a plurality of passages between the gas-filled pockets of the plurality of gas-filled pockets.

8. The roofing system of claim 1, wherein the roofing composite membrane has a thickness of 1/16" to 1/2".

9. The roofing system of claim 1, wherein the first layer comprises a plurality of ribs, wherein the plurality of ribs defines the plurality of pockets.

10. The roofing system of claim 1, wherein an area of the plurality of gas-filled pockets is 30% of an area of the first layer.

11. A roofing system, comprising:
a sloped roof comprising a substrate;
a roofing composite membrane installed on the substrate, wherein the roofing composite membrane comprises:
a first layer,
wherein the first layer further comprises a plurality of pockets spaced along at least one side thereof;
a second layer covering the first layer, thereby to form a plurality of closed pockets;
a gas trapped within the plurality of closed pockets, thereby to form a plurality of gas-filled pockets;
an asphaltic roofing shingle installed directly on the roofing composite membrane
wherein the roofing shingle is an outermost layer; and
wherein the roofing shingle is exposed to environment.

12. The roofing system of claim 11, wherein the first layer comprises at least one of plastic, rubber, paper, cardboard, or metal.

13. The roofing system of claim 11, wherein the plurality of gas-filled pockets is configured to be compressible and dissipate energy when impacted by an object.

14. The roofing system of claim 11, wherein the gas comprises air.

15. The roofing system of claim 11, wherein the second layer comprises at least one of thermoplastic polyolefin (TPO) or polyvinylchloride (PVC).

16. The roofing system of claim 11, wherein the second layer comprises at least one of a thermoplastic or a thermoset.

17. The roofing system of claim 11, wherein each of the gas-filled pockets of the plurality of gas-filled pockets has a circular shape, diamond shape, square shape, or rectangular shape.

18. The roofing system of claim 11, wherein the roofing composite membrane comprises a plurality of passages between the gas-filled pockets of the plurality of gas-filled pockets.

19. The roofing system of claim 11, wherein the roofing composite membrane has a thickness of 1/16" to 1/2".

20. The roofing system of claim 11, wherein the first layer comprises a plurality of ribs, wherein the plurality of ribs defines the plurality of pockets.

* * * * *